United States Patent [19]

Swenson

[11] 3,908,726

[45] Sept. 30, 1975

[54] COLLAPSIBLE HAND SAW

[76] Inventor: Richard E. Swenson, 17116 Vermillion Rd., Duluth, Minn. 55803

[22] Filed: Jan. 4, 1974

[21] Appl. No.: 430,687

[52] U.S. Cl. .............................................. 145/33 E
[51] Int. Cl.² ........................................ B27B 21/02
[58] Field of Search ..... 145/32 R, 32 A, 32 B, 33 R, 145/33 A, 33 AB, 33 B, 33 C, 33 D, 33 E, 34 R, 34 A

[56] References Cited
UNITED STATES PATENTS

| | | | |
|---|---|---|---|
| 1,713,972 | 5/1929 | Lufkin | 145/33 R |
| 3,339,602 | 9/1967 | Wilson | 145/33 E |
| 3,724,519 | 4/1973 | McCord | 145/33 E |

FOREIGN PATENTS OR APPLICATIONS

| | | | |
|---|---|---|---|
| 201,764 | 2/1966 | Sweden | 145/33 E |

*Primary Examiner*—Al Lawrence Smith
*Assistant Examiner*—Marc R. Davidson
*Attorney, Agent, or Firm*—Wicks & Nemer

[57] ABSTRACT

A collapsible hand saw including an elongated back bar having a channel-shaped cross-section together with a saw blade pivotally connected at its outer end to the outer end of the back bar and adapted to be pivotally moved into and out of the back bar. The blade is connected at its other end to a handle which is formed of metal rod stock having a front portion, an end portion and a rear portion disposed parallel to and spaced from said front portion. Formed on the free end of the rear portion is an offset portion. The saw in assembled condition includes the end of the front portion of the handle in engagement with the bottom of the back bar with the threaded offset end of the rear portion extended through a hole in the bottom of the back bar and drawn up on the back bar by a threaded member which draws up the blade rigidly on the back bar and handle. The saw in collapsed and folded condition includes the blade pivoted into the back bar with the back bar mounted within the rod portions and the offset portion of the rear handle portion extended through a retainer member secured to the back bar with the threaded member drawn up on the offset portion and against the retainer.

2 Claims, 4 Drawing Figures

COLLAPSIBLE HAND SAW

SUMMARY

The invention relates to hand saws and more particularly to a hand saw that is collapsible. It is an object of the invention to provide a collapsible hand saw with a handle simply, easily and economically formed of metal rod stock together with a back bar and a blade. With the blade connected to the handle and the back bar, the handle is easily and effectively drawn up relative to the back bar thereby tightening up the blade. The saw may be easily disassembled by reversing the assembly process and storing the back bar and blade within the handle and securing the same by drawing up the handle upon the back bar by means of a rod portion of the handle secured in a retainer member on the back bar.

In the drawings forming part of this application:

Figure 1:
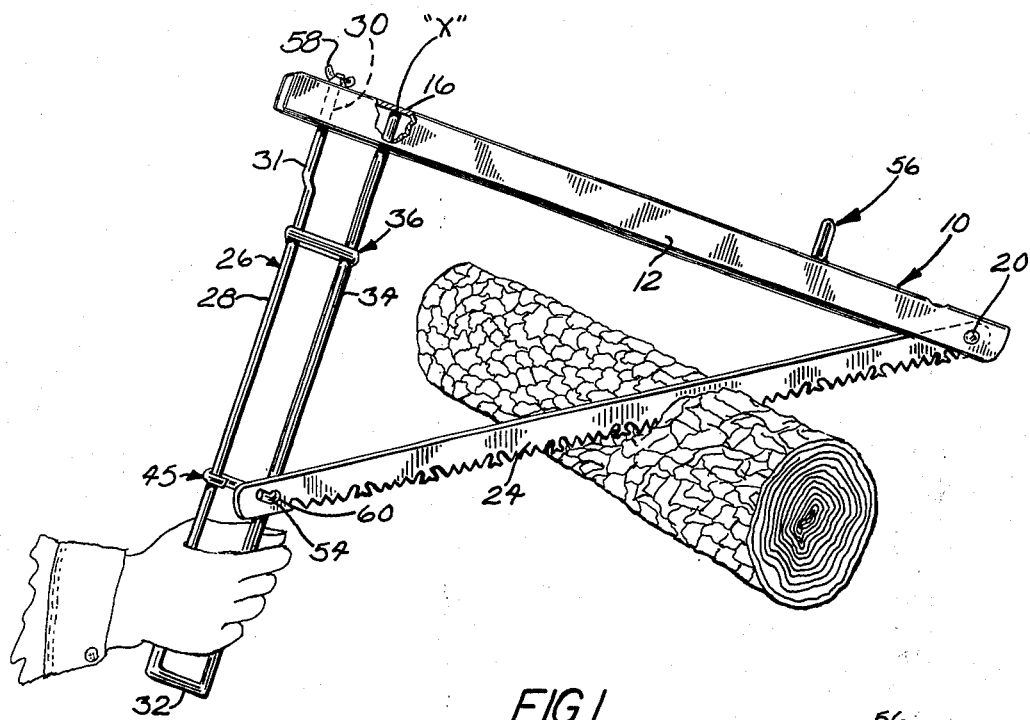
FIG. 1 is a perspective view of a collapsible saw embodying the invention and shown in operative sawing position with the hands of an operator.

Referring to the drawings in detail, the saw A includes the back bar 10 which is channel-shaped in transverse section and has the spaced side walls 12 and 14 joined by the bottom portion 16. The outer ends of the walls 12 and 14 are each formed with a hole 18 through which the pin 20 is fixed. The pin 20 is extended through a hole 22 formed in the outer end portion of the saw blade 24 thereby pivotally mounting the outer end of the blade on the outer end of the back bar 10. The inner end portion 16 of the bar 10 is formed with the hole 21.

Further provided is the handle 26 which is formed of heavy rod stock and includes the rear elongated portion 28 which is threaded at its upper end as at 30 on the offset portion 31. The lower end of the rear portion 28 terminates in the right-angle, relatively short end portion 32 which in turn terminates in the elongated front portion 34 right angularly disposed to the end portion 32 and spaced from and parallel to the rear portion 28.

The numeral 36 designates a first brace and back bar retainer which has a loop-like formation and includes the side portions 38 and 40 connected by the first end portion 42 and the second end portion 44 with the space between the side portions sufficient to slidably receive the back bar 10 therebetween. The end portions 42 and 44 of the brace 36 are welded to the rear portion 28 and front portion 34, respectively, with the looplike brace 36 surrounding the handle portions 28 and 34.

Further provided is the second brace and back bar retainer 45 which includes the side portion 46 which terminates in the top end portion 48 which in turn terminates in the short side portion 50. The side portion 46 terminates at the lower end in the lower end portion 52 which in turn terminates in the short side hook portion 54. The numeral 56 designates a retainer which is formed as a closed link in a chain. The lower end of the link 56 is welded to the top portion 16 of the back bar 10.

Figure 2:
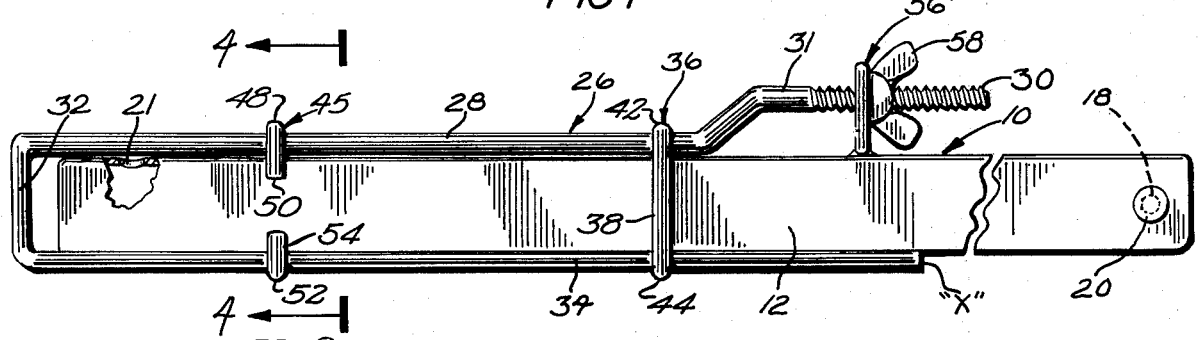
FIG. 2 is a longitudinal side elevational view of the saw in a collapsed, folded and secured condition.
Figure 3:
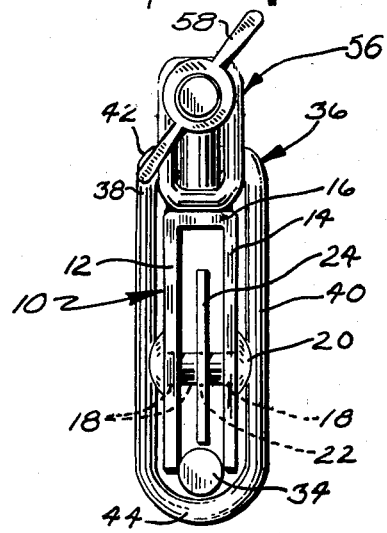
FIG. 3 is an enlarged end view of the saw as in FIG. 2.
Figure 4:
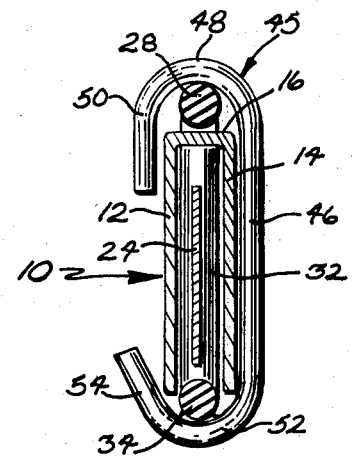
FIG. 4 is an enlarged sectional view on the line 4—4 of FIG. 2.

In collapsed folded and secured condition the saw includes the back bar 10 with the saw blade positioned within the same and the back bar slipped through the braces 36 and 45 with the end of the back bar abutting the end portion 32 of the handle, particularly FIG. 2. In this condition the offset portion 31 of the handle 26 extends through the retainer 56, and with the wing nut 58 drawn up on the threaded portion 30 of the offset portion 31 and against the retainer 56 with the end 32 in abutment with the end of the back bar, the back bar is secured substantially within the handle.

In assembly of the saw the wing nut 58 is removed and the back bar slipped out of the retainers 36 and 45. The blade 24 is pivotally moved out of the back bar 10. The handle 26 is manipulated so that the offset portion 31 of the handle is inserted through the hole 21 of the back bar with the end X of the handle portion 34 inserted into the back bar and against the bottom portion 16 as a pivot point, particularly FIG. 1. The other end of the blade has the hole 60 which is engaged on the hook 54 of the retainer 45. The wing nut 58 is then tightened upon the bottom portion 16 of the back bar 10 which draws up on the handle portion 28 while pivoting on the end X of the handle portion 34 upon the inside surface of the bottom portion 16 of the back bar. At the same time the hook 54 draws on the blade to thereby draw up and tighten the blade from pin 20 to hook 54 in a substantially rigid condition for use as in FIG. 1.

I claim:

1. A collapsible hand saw comprising:
 a. an elongated back bar having inner and outer ends,
 b. a saw blade pivotally connected at its outer end to outer end of the back bar and adapted to be pivotally moved into and out of alignment with the back bar,
 c. a handle having upper and lower ends,
 d. means engaging the inner end of the blade to the lower end of the handle,
 e. said handle having shoulder means on the upper end thereof for pivotal contact and bearing engagement with said back bar,
 f. said handle having rigid means on the upper end thereof for releasable engagement with said back bar and spaced from said shoulder means,
 g. means for securing said rigid engagement means of said handle to said back bar while said handle is pivoted on said shoulder means of the handle to also bias said blade into an extended position on said handle and said back bar,
 h. said back bar being channel-shaped in cross-section and including spaced side walls joined by a bottom portion,
 i. said shoulder means of said handle including a front rod portion thereof, and
 j. said releasable securement means of said handle including a rear rod portion,
 k. said means for securing said rear rod portion means includes said rod being threaded and equipped with
 l. a threaded member,
 m. said rear rod portion including an offset portion,
 n. said back bar including a retainer member thereon through which said offset portion of said draw-up rear rod portion is inserted and secured with said threaded member with said blade in alignment with said back bar thereby holding the saw in collapsed condition.

2. A collapsible hand saw comprising:

an elongated back bar having inner and outer ends and having spaced walls and a bottom portion, b. a saw blade having inner and outer ends and pivotally connected at its outer end to the outer end of the back bar and adapted to be pivotally moved into and out of alignment with the back bar, c. a handle having upper and lower ends and including a rear rod portion threaded at the upper end and which terminates at the lower end in d. an end portion which terminates at the lower end of a e. front rod portion disposed parallel to said rear rod portion and spaced therefrom, f. means engaging the inner end of the blade to the lower portion of the handle, g. the upper end of said front rod portion in engagement with the bottom portion of said back bar with h. the upper end of the rear rod portion of the handle extended through a hole in the inner end of the back bar and secured on said back bar by i. a threaded member.

* * * * *